United States Patent [19]

Gipe et al.

[11] 4,287,604
[45] Sep. 1, 1981

[54] RF AND IF CIRCUITRY OF AN UPLINK RECEIVER

[75] Inventors: Robert C. Gipe, Cheverly; William E. Engelkemier, Beltsville, both of Md.

[73] Assignee: The United States of America as represented by the Secretary of the Navy, Washington, D.C.

[21] Appl. No.: 31,265

[22] Filed: Apr. 18, 1979

[51] Int. Cl.³ .............................................. H04B 1/26
[52] U.S. Cl. .................................... 455/323; 455/326
[58] Field of Search ............... 329/104; 455/205, 207, 455/214, 313, 318, 323, 326, 327, 337

[56] References Cited

U.S. PATENT DOCUMENTS

| | | | |
|---|---|---|---|
| 2,911,528 | 11/1959 | McRae | 325/487 |
| 3,619,786 | 11/1971 | Wilcox | 325/411 |
| 3,622,895 | 11/1971 | Starkey et al. | 325/320 X |
| 4,163,944 | 8/1979 | Chambers et al. | 325/446 |

OTHER PUBLICATIONS

"Microstrip Balanced Mixer for S-Band Receiver", by Chatterjee et al., pp. 415–418, 8/1974.

Primary Examiner—Jin F. Ng
Attorney, Agent, or Firm—R. S. Sciascia; A. L. Branning

[57] ABSTRACT

The present invention relates to uplink receiver circuitry which combines a local oscillator signal with an S-Band signal in a high-level mixer, operating in saturation, to produce an intermediate frequency (IF) signal in a high-level mixer. The use of a saturated high-level mixer enables the circuitry to convert received RF signals into undistorted IF signals without an RF limiter and its attendant dynamic range restrictions and distortion.

7 Claims, 4 Drawing Figures

RF AND IF CIRCUITRY OF AN UPLINK RECEIVER

BACKGROUND OF THE INVENTION

In various communication uplink systems, signals at the output of a receiving antenna vary from a maximum value of +60 dBm to a minimum of −15 dBm. Receiver circuitry connected to such an antenna is thus required to process signals over a 75 dB dynamic range. A good IF limiter could satisfy such dynamic range requirements, however uplink receivers in the past have not used the IF limiter in this way. In the prior art, signals from an antenna have first entered an RF limiter which then passed the signal to a fixed 45 dB attenuator. The output from the attenuator would then enter a low level mixer together with the output from a local oscillator. The output from the low level mixer would represent a dynamic range considerably less than the 75 dB characteristic of the signal at the output of the antenna. The output of the low level mixer was then entered into the IF limiter. By the time the signal entered the IF limiter, much of the upper portion of the dynamic range—which was within the limits of the IF limiter—was lost in the systems of the prior art.

The loss of dynamic range is attributable to the restrictions inherent in the low level mixer and the IF limiter when used together: the low level mixer having a maximum allowable input of 0 dBm with a conversion loss of 7 dB and the IF limiter being restricted in dynamic range between −70 dBm and 30 15 dBm by its design. As a result of these limitations, prior art schemes have not only failed to maximize the dynamic range capabilities of the IF limiter, but also required the use of an RF limiter in order to restore at least some of the upper portion of the signal that would be lost after the 45 dB attenuation and the low level mixing. Without the RF limiter, the +60 dBm signal would be attenuated 45 dB to +15 dB which is not an allowable input to the low level mixer. All signals between 0 and +15 dBm would thus be lost in the low level mixer stage. The RF limiter, in effect, transforms the "+60 dBm to −15 dBm" range into a "+45 dBm to −15 dBm" range, lowering and compressing the signal from the antenna to better fit the 45 dB attenuator and the low level mixer.

U.S. Pat. Nos. 3,185,931, 3,292,093, and 3,387,220 represent various prior art circuits which demodulate square FM signals into a corresponding sinusoid. U.S. Pat. No. 3,185,931 is not especially directed to mark-and-space data and does not vary the sinusoidal period depending on whether a mark is followed by a space or another mark. Similarly, U.S. Pat. No. 3,292,093 does not provide distinct but varying sinusoid outputs depending on a mark or space data sequence. U.S. Pat. No. 3,387,220 does disclose the demodulating of mark and space data into an alternating signal waveform, the varying of the waveform period depending in some way on the data; however, this reference teaches a three-level output signal without clear sinusoid characteristics and does not disclose two distinct waveform characteristics depending on what data follows a mark. None of the above references (nor any other known prior art) propose the elimination of RF limiting in a receiver system by using high level mixing. Such references thus fail to detect signals—with minimal noise, nonlinearity, and other distortion—over the full dynamic range of the receiver.

In general, the use of an RF limiter and the failure to exploit the full dynamic range of the receiver and its IF limiter does not especially adversely affect the operation of a communication receiver. In applications where waveform distortions and transients are particularly undesirable, however, the use of an RF limiter, which alters the initial signal, creates problems which make its use impractical.

SUMMARY OF THE INVENTION

It is thus an object of the present invention to provide circuitry which avoids the necessity of using an RF limiter and permits the use of the IF limiter over its entire dynamic range. In order to achieve this, the present invention uses a high level, double balanced mixer stage having a maximum allowable input of +15 dBm with a conversion loss of 10 dB at +15 dBm input and 5 dB at −60 dBm input as contrasted with the prior art low level mixer described above. It is particularly significant that the invention in maintaining the dynamic range, drives the mixer into saturation at higher input levels. The mixer in this way serves to limit the output level without introducing the problems associated with RF limiters. Operation at saturation is permissible in this particular application since the mixer is immediately followed by an IF limiter and linear operation is therefore not required.

As a result of mixer symmetry, even order harmonic intermodulation distortion at saturation is suppressed 43 dB or more. Also, the odd order distortion products which are not suppressed are removed by subsequent filtering which also removes the distortion products generated by the IF limiter.

Two-tone, third-order intermodulation distortion at saturation is no problem if the frequency separation between the interfering and desired signals at the mixer input is kept greater than the IF bandwidth. For frequency separations less than the IF bandwidth, the interfering signal input level must be kept 25 dB or more below the desired signal input level in order to keep the amplitude of the third-order distortion products 40 dB or more below the amplitude of the desired IF output.

The present invention, in fact, provides two IF filters on either side of the IF limiter. The filter which precedes the limiter prevents signals which are outside the optimal bandpass from capturing the IF limiter whereas the second IF filter eliminates harmonics generated by the IF limiter itself.

Because of the accuracy required by the present receiver, strict requirements of stability and linearity in its detection stages are provided. To accomplish this a wideband, differential delay type discriminator is used.

Major objectives of the present invention include: the achieving of linearity in RF and IF phase characteristics; achieving linear discriminator characteristics; and achieving optimum video filter characteristics. The first two objectives relate to minimizing signal distortion (where the present invention is concerned with signals formatted in mark-and-space format). The third objective is concerned with providing maximum possible rejection of transmitter noise and spurious signals in the receiver without distorting the desired mark sine wave.

The invention which achieves these objectives will now be described.

DESCRIPTION OF A PREFERRED EMBODIMENT OF THE INVENTION

Figure 1:
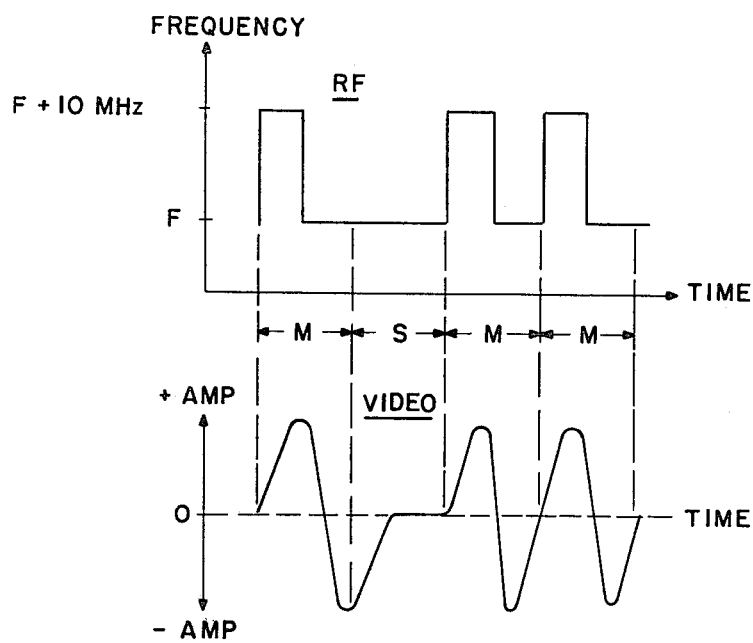
FIG. 1 shows the input and desired output of the present invention.
Figure 2:
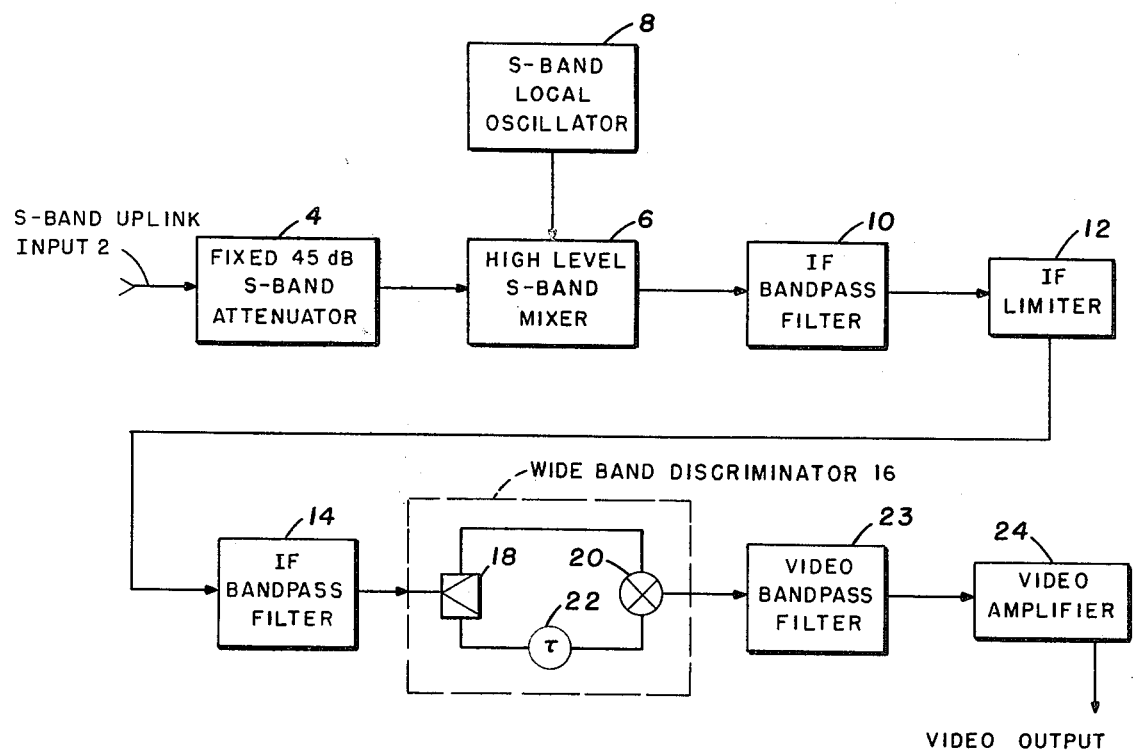
FIG. 2 shows a block diagram of the invention.

Referring to FIG. 1, a frequency modulated (FM) mark and space formatted signal is shown as it enters the present invention and as it leaves the invention as output. In the upper portion of FIG. 1, the presence of a mark as input is shown by a rectangular frequency shift; the absence of such a shift indicates a space. The lower portion of FIG. 1 illustrates the desired output in sinusoidal form. It should be noted that a mark followed by a space is represented by a sinusoidal cycle having a period just greater than one bit interval. For a series of marks, the sinusoid cycle representing each mark extends only one bit interval in length. FIG. 2 shows a block diagram of the present receiver which transforms the rectangular FM modulation into undistorted, symmetrical, sine wave output.

Figure 3:
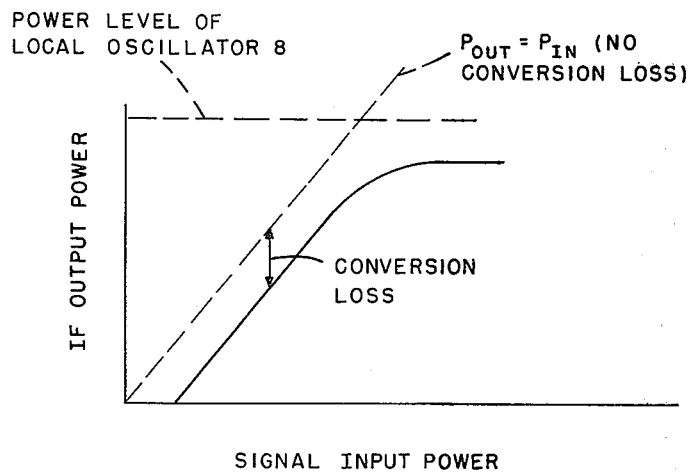
FIG. 3 shows the conversion characteristic of a mixer used in the invention.

S-band uplink input is shown coming from an antenna 2 and entering a fixed 45 dB S-band attenuator 4. The signal entering the attenuator 4 has a dynamic range covering a 75 dB range having a maximum of +60 dBm. The effect of the attenuator 4 is to diminish the gain of all portions of the signal by 45 dB, altering the dynamic range to between +15 dBm maximum to −60 dBm minimum. With this attenuation there is no introduced distortion to the signal and the signal can be entered into a high level mixer 6 which, driven into saturation, achieves a maximum allowable input of +15 dBm as contrasted with the low level mixers of the prior art which have run along the linear portion of their conversion characteristics and achieved only a 0 dBm maximum. Mixing the attenuated signal with the output from an S-band local oscillator 8 an intermediate frequency (IF) signal is produced. Because the high level mixer 6 has a saturated conversion loss of 10 dB at +15 dBm input and an unsaturated conversion loss of 5 dB at −60 dBm input, the output signal from the high level mixer 6 ranges between +5 dBm and −65 dBm which illustrates the limiting action of the high level mixer 6. Mixer 6, as a double balanced mixer, can be analyzed as a periodic reversing switch connected between the S-band mixer input and the IF output. Control of the switch state (between normal or reversed states) is provided by the polarity of the switching signal which in this case is the signal from oscillator 8. At low input signal levels, the conversion loss is calculated from the S-band mixer input to the first order IF sideband output. At very high input signal levels, when the signal power is significantly greater than the power from oscillator 8, the input signal assumes the switching role and conversion loss must be calculated from the output of the oscillator 8 to the first order IF sideband output. Since the output power level of oscillator 8 is constant, IF sideband output power is constant and the mixer 6 in saturation, functions as a limiter as well as a mixer. This characteristic is illustrated in FIG. 3. The ideal case of perfect switching and no conversion loss is shown by the dotted line with unity slope which intersects the horizontal dotted line drawn at the local oscillator power level. The response of a practical mixer is shown by the solid curve which is displaced from the ideal curve by the conversion loss of the mixer 6.

The upper limit on signal input power under saturated conditions is governed principally by two factors: (1) the reverse breakdown voltage rating of the diodes in the mixer 6 (2) the tolerable level of intermodulation distortion products which are generated. In the case of the present uplink receiver, a mixer 6 is selected which eliminates diode breakdown as a problem. The upper limit is thus determined solely by the tolerable distortion level.

Figure 4:
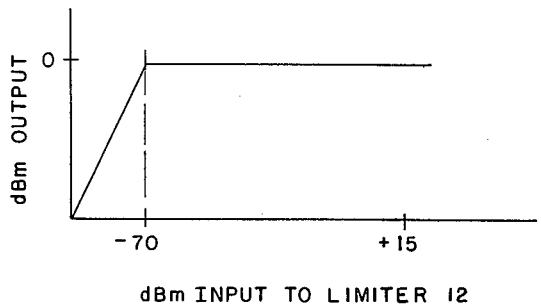
FIG. 4 shows the characteristics of the IF limiter.

The amplitudes of the distortion products, relative to the desired IF signal, depend primarily on the S-band input level to mixer 6 which is typically 35 dB below the level of oscillator 8. As the level of S-band mixer input increases, the amplitudes of the distortion products will increase linearly with slopes equal to the order of the IF harmonic. When the level of S-band mixer input approaches the level of local oscillator 8, which is the beginning of the saturation region, the slopes of the distortion products will tend to flatten out or reverse and their amplitudes will never exceed some maximum level that is typically 25 dB below the desired IF signal. In the double balanced mixer 6, both the S-band mixer input signal and signals from oscillator 8 and all of their even order harmonics are suppressed in the IF output as a result of mixer symmetry (as previously mentioned). This holds true even in the saturated region. The output of mixer 6 enters an IF bandpass filter 10 which, in turn, feeds an IF limiter 12. The purpose of the IF bandpass filter 10 is to prevent out-of-band signals from capturing the IF limiter 12. The characteristics of the IF limiter 12 are best described in FIG. 4 by comparing the dBm input to the dBm output of the IF limiter 12. With an input to the IF limiter 12 between −65 dBm and +15 dBm the output is 0 dBm. Inputs less than −70 dBm decrease approximately linearly from the 0 dBm output. As is readily apparent from the above discussion, the dynamic range output (−65 dBm to +5 dBm) from the high level mixer 6 is within the dynamic range limits of the IF limiter 12. The output signal from IF limiter 12 is thus essentially free of amplitude variation.

From IF limiter 12 the signal then enters another IF bandpass filter 14 the purpose of which is to eliminate harmonics generated by the IF limiter 12. The output of the IF bandpass filter 14 enters a wide-band discriminator 16. The output from the discriminator 16 is a DC voltage that varies as a function of the input frequency. Thus the output from the discriminator 16 is a video representation of the FM mark and space modulation on the IF input signal. Discriminator 16 is similar to that shown in U.S. Pat. No. 3,919,653. As in the cited patent, one of the divided signals from a divider 18 enters a mixer 20 directly while the second divided signal passes through a delay 22 and then enters the mixer 20 together with the undelayed divided signal. The output of mixer 20, which is the video output of the wide band discriminator 16, enters a video bandpass filter 23 which is the subject of a patent application, Ser. No. 019,039 filed on Mar. 9, 1979. The video bandpass filter 23 is designed to block out fixed DC components of the FM signal, to peak at a desired frequency, to attenuate the signal at the cut-off frequency in such a way as to not disturb the characteristics of the signal at the desired peak frequency, and to greatly attenuate the signal beyond the cut-off frequency. The output of the video bandpass filter 23 is undistorted; space interval signal representations are well defined with only a slight amount of base line tilt. The video bandpass filter 23 outputs its signal into a conventional video amplifier 24 which was adapted for use in the present receiver. The purpose of the video amplifier 24 is to restore some of the sensitivity which is sacrificed by the discriminator 16 in order to achieve high stability and linearity.

Various other modifications, adaptations and alterations are of course possible in light of the above teachings. Therefore, it should be understood at this time that within the scope of the appended claims the invention may be practiced otherwise than as specifically described.

What is claimed is:

1. Apparatus for converting an FM mark-and-space RF signal in the S-band to an intermediate frequency mark-and-space signal comprising:
   means for attenuating the RF S-Band signal,
   a local oscillator producing a signal at a fixed level, and
   a high-level mixer means, having linear and saturation modes, for mixing the attenuated S-Band signal with the signal produced by the local oscillator and for limiting while the mixer means is in the saturation mode.

2. Apparatus, as in claim 1, wherein the high-level mixer means is a double balanced, symmetric mixer.

3. Apparatus, as in claim 2, further comprising:
   an IF limiter means for hard-limiting the output from the high-level mixer means.

4. Apparatus, as in claim 3, further comprising:
   IF filtering means connected to the IF limiter for preventing out-of-band signals from capturing the IF limiter and for suppressing harmonics generated by the IF limiter.

5. Apparatus, as in claim 4, further comprising:
   a wide band discriminator, having the IF filtering means outut as input, said wide band discriminator providing a video output.

6. Apparatus, as in claim 5, further comprising:
   video bandpass filter means, having the video output from the wide band discriminator as input, for blocking out fixed DC levels and for passing maximum signal at a peak frequency and minimum signal above a cut-off frequency.

7. Apparatus, as in claim 2, wherein the mixer means comprises means for providing an output signal having greater signal conversion loss at high input signal levels than at low input signal levels.

* * * * *